S. W. Warren,
Pipe Coupling,
Nº 28,221.   Patented May 8, 1860.
Fig: 1.
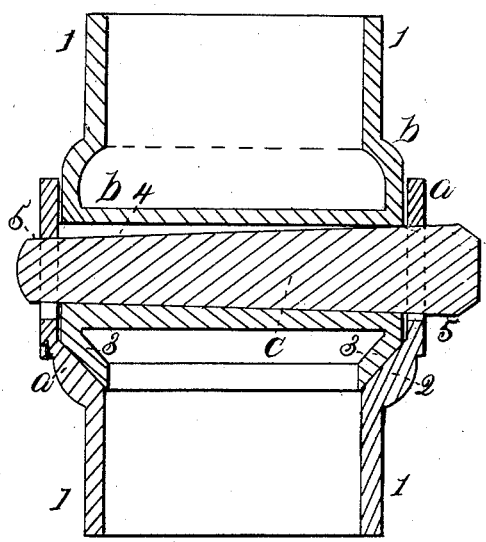
Fig: 2.
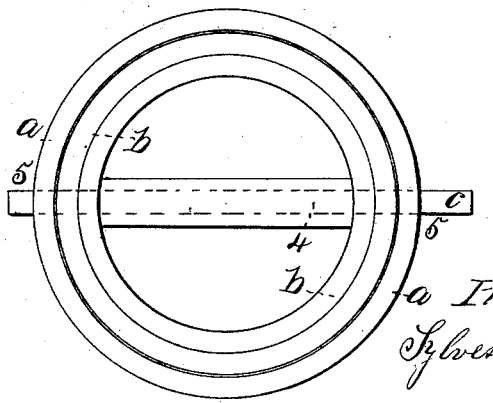
Witnesses:
Lemuel W. Serrell
Chas. H. Smith
Inventor:
Sylvester W. Warren

UNITED STATES PATENT OFFICE.

SYLVESTER W. WARREN, OF BROOKLYN, NEW YORK.

IMPROVEMENT IN HOSE-COUPLINGS.

Specification forming part of Letters Patent No. 28,221, dated May 8, 1860.

*To all whom it may concern:*

Be it known that I, SYLVESTER W. WARREN, of Brooklyn, in the county of Kings and State of New York, have invented and made a certain new and useful Improvement in Couplings for Pipes, Hose, &c.; and I do hereby declare that the following is a full, clear, and exact description of the construction and operation of my said invention, reference being had to the annexed drawings, making part of this specification, wherein—

Figure 1 is vertical section of said coupling, and Fig. 2 is an end view of the same.

Similar letters denote the same parts.

Screw-couplings for leather or other hose have heretofore been made so as to confine a leather or elastic washer between the ends of the metallic thimbles connected to the respective lengths of hose, and the "union joint" is well known for steam, water, and gas pipes and joints, and there have been instances in which a pin has been inserted through two pipes slipped into each other for the purpose of holding them together. All these devices are more or less objectionable. The screw-couplings do not always fit each other, and the power required for screwing the pipes tightly together often twists or injures one of said pipes and difficulty arises in keeping the parts water or steam tight.

My said invention, as distinguished from all others, consists in a pipe or hollow seat for a key, which key passes across through one pipe and acts against the edges of mortises in a surrounding pipe to force the ends of said pipes or couplings toward each other and make a perfectly tight connection, because the key passing transversely of the pipe or coupling cannot leak, being inclosed in the case or pipe formed across the coupling to receive said key.

In the drawings, $a$ is a coupling attached to or formed with the pipe or hose, and $b$ is the other part of the coupling.

1 1 are the cylindrical parts, to which the respective pipes or hose are secured by a screw, ring, rivets, or other well-known means.

The coupling $a$ is sufficiently large to allow the coupling $b$ to enter within it, and at 2 and 3 the respective parts are formed as seats, coming in contact with each other or with an intervening washer. When a washer is introduced at this point, the respective seats should be flat; but when formed conical, as shown, they should be ground to a true joint.

$c$ is the cross-key, introduced through the hollow seat 4, that passes across the coupling $b$, and in the coupling $a$ mortises 5 are introduced. It will now be evident that when the parts $a$ and $b$ are placed together and the key driven up the two parts will be connected together steam, fluid, or water tight. The key $c$ is to take a bearing upon the bottom of the seat 4 next the seats 2 3, while the resisting parts of the mortises 5 take against the other side of the key.

The coupling $a$ may be made with lugs projecting out so as to protect the key from being accidentally knocked out, or a clamping-screw or equivalent means may be used to hold the key in its place.

The hollow key-seat 4, passing across the bore of the coupling $b$, will not obstruct the flow of liquid if inclined or tapered at the edges, and the coupling at this point may be made larger to maintain the same cross-sectional area as the pipe.

What I claim, and desire to secure by Letters Patent, is—

The hollow key-seat 4 across the coupling $b$, receiving the key $c$, that connects the parts $b$ and $a$ in the manner substantially as specified.

In witness whereof I have hereunto set my signature this 16th day of April, 1860.

SYLVESTER W. WARREN.

Witnesses:
LEMUEL W. SERRELL,
CHAS. H. SMITH.